INVENTOR:
HANS HINZ

Oct. 12, 1971 H. HINZ 3,611,467
PIPELINE SCRAPER TRAP

Filed Aug. 25, 1969 3 Sheets-Sheet 3

INVENTOR:
HANS HINZ 3,611,467
PIPELINE SCRAPER TRAP
Hans Hinz, Hamburg, Germany, assignor to
Shell Oil Company, New York, N.Y.
Filed Aug. 25, 1969, Ser. No. 852,758
Claims priority, application Germany, Sept. 9, 1968,
P 17 75 673.9
Int. Cl. B08b 9/04
U.S. Cl. 15—104.06 A 5 Claims

ABSTRACT OF THE DISCLOSURE

Scraper trap for use with a pipeline and including a housing having a movable sleeve means disposed therein, said sleeve means being adapted to receive said scraper and effective to control material flow between the pipeline and material receiving means such as a storage tank.

---

The present invention relates to an automatic device for manipulating scrapers, or pigs as they are termed, in pipelines.

Such pigs are frequently used in pipelines through which various liquids have to be pumped in succession, for example transport lines from production sites to tanks or from tanks to filling points, in order to clear the line after a batch has been pumped through. This prevents contamination of the following batch by residues of the previous batch which have remained in the line and the losses which would occur if the line were emptied before switching over to other connections. To this end, after pumping has been completed, the pig is propelled from one end of the line to the other by means of a compressed gas—usually compressed air—in such a manner that the line contents displaced by the pig flow back into the storage tank or are collected in any other suitable way.

Special devices—pig traps—are installed at both ends of these lines for manipulation of the pigs. The trap normally comprises a T branch arranged a short distance before the blind end of the line. The branch is connected with the storage tank or the like by means of a valve or any other shutting-off device, and forms the passageway for the liquid. The blind end of the line serves to receive the pigs; it is provided with a by-pass to the storage tank, which by-pass can be shut off, and with a connection for the compressed air. After pumping has been completed, the valve first remains open; if a pig is subsequently introduced into the line from the other end, it moves up to the branch and stops, compressed air escaping into the storage tank. The valve is then closed. The pig then slides up to the blind end of the pipeline, the liquid contents of which escapes into the tank via the by-pass. The supply of compressed air from the other end is subsequently turned off, and the pressure in the line is released. For the reverse procedure, after pumping has been terminated, the valve is closed, the by-pass is shut off and the compressed air supply is opened until the described procedure is completed at the other end of the line. This process is troublesome and requires a relatively large operating staff. The unavoidable escape of compressed air into the storage tanks is undesirable and, under certain circumstances, expensive, for example when using inert gas instead of compressed air.

SUMMARY OF THE INVENTION

It is therefore an object of the present invention to provide an improved pig trap arrangement in which the aforesaid drawbacks are avoided.

This and other objects have been attained in the present invention as follows:

The invention relates to an improved pig trap and comprises one or more movable sleeves at the T branch which are held in place by spring tension and, in the position of rest, free the connection between the line and the tank. If the sleeves are moved in either direction from their position of rest, they shut off the connection to the tank. The movement of the sleeves is caused by the arriving or departing pig itself. The procedures described above are automatic; the escape of compressed air into the tank is avoided.

DESCRIPTION OF THE DRAWING

The above and other objects of the present invention will be understood from the following description taken with reference to the drawing wherein:

Referring now to FIG. 1, the housing of the scraper or pig trap device is formed by a pipe 1, which is connected by means of a flange 2 to the pipeline (not shown) through which liquids are to be pumped. The other end of the housing 1 is closed by means of a cover 3. The housing 1 has distributed over its periphery a series of openings 4 which lead into an annular space 17 under an outer jacket pipe 5. This jacket pipe is provided with a branch 6 leading to the storage tank, the filling point or the like (not shown).

Figure 1:
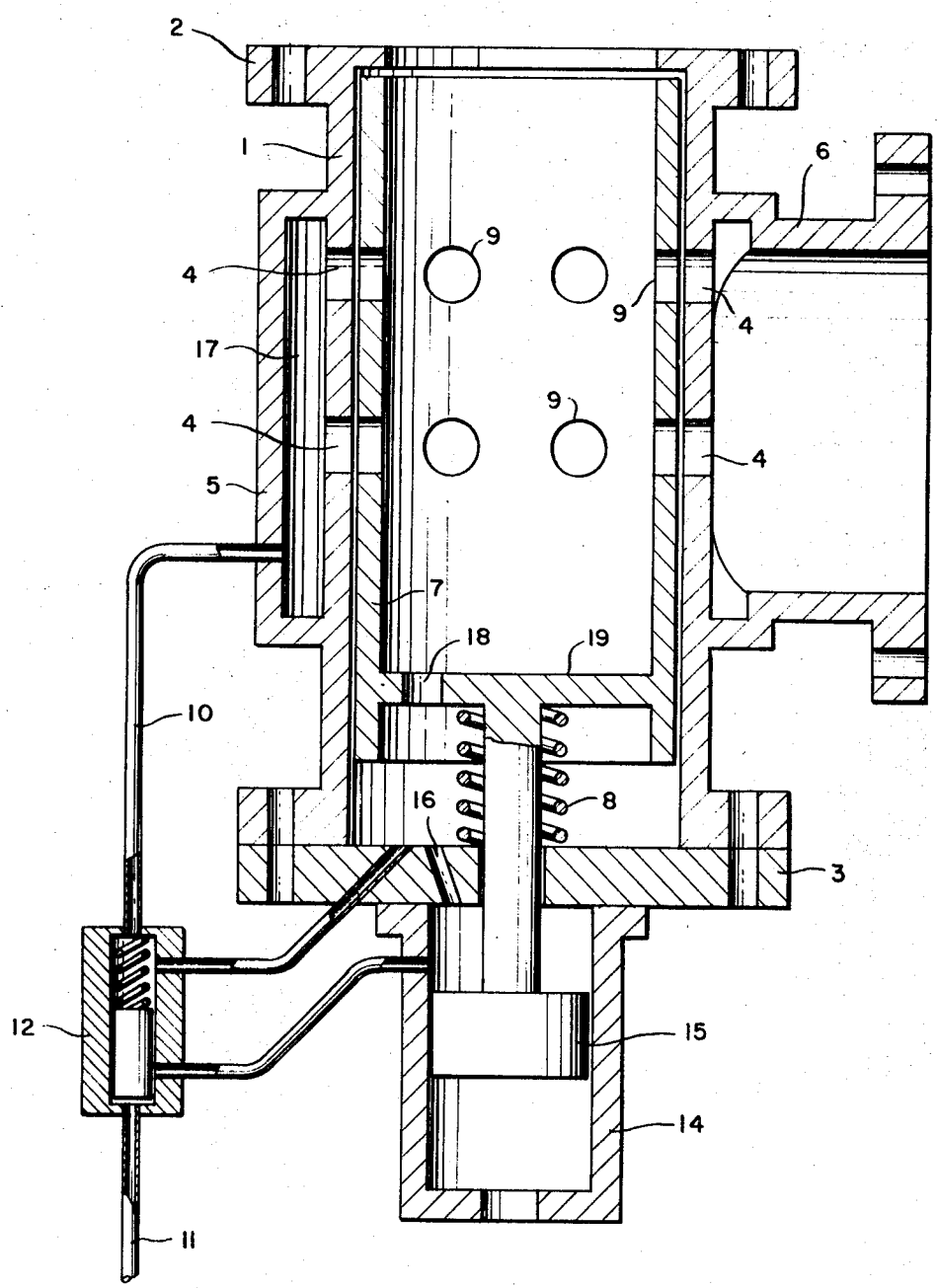
FIG. 1 is a diagrammatic view of a pig trap according to the present invention.

A sleeve 7 is slidably arranged in the housing 1. In its position of rest, the sleeve is kept in abutment (the upper end in the drawing) by means of a spring 8. In said position, its openings 9 are in register with the openings 4 in the wall of the housing 1, so that the passageway from the pipeline to the storage tank or the like is free.

The device operates as follows:

When a pig dispatched from the other end of the pipeline reaches the trap and enters the sleeve 7, the latter follows the movement of the pig owing to wall friction and slides downward (in the drawing) against the pressure of the spring 8. As a result, the passageway through the openings 9 and 4 is closed, and consequently the storage tank or the like is shut off from the pipeline. The pig continues to move down to the lower end (in the drawing) of the sleeve 7, the liquid still present in the sleeve escaping through an opening 18 in its bottom 19 and a by-pass 10. The sleeve 7 first remains in its lower position under the pressure of the compressed air which propelled the pig. After the supply of compressed air has been turned off and the pressure in the pipeline has been released, the spring 8 returns the sleeve 7 to its position of rest and the connection between storage tank or the like and pipeline through the openings 9 and 4 is again free.

If, for example, the pig is to be dispatched in the opposite direction, after the next pumping operation, compressed air is fed into the device through a line 11. The line 11 is provided with a valve 12 which closes the by-pass 10 as soon as the compressed air line 11 is put into operation. The compressed air first enters a cylinder 14, moving down (in the drawing) a piston 15 and with it the sleeve 7, as a result of which the connection between the storage tank and the pipeline is again closed. The compressed air escapes into the sleeve 7 through a bore 16 and moves the pig out of the sleeve and further through the pipeline. The continued pressure on the piston 15 retains the sleeve 7 in the lower position until the operation has been completed and the pressure in the pipeline has been released, after the compressed air supply through the line 11 has been shut off.

Figure 2:
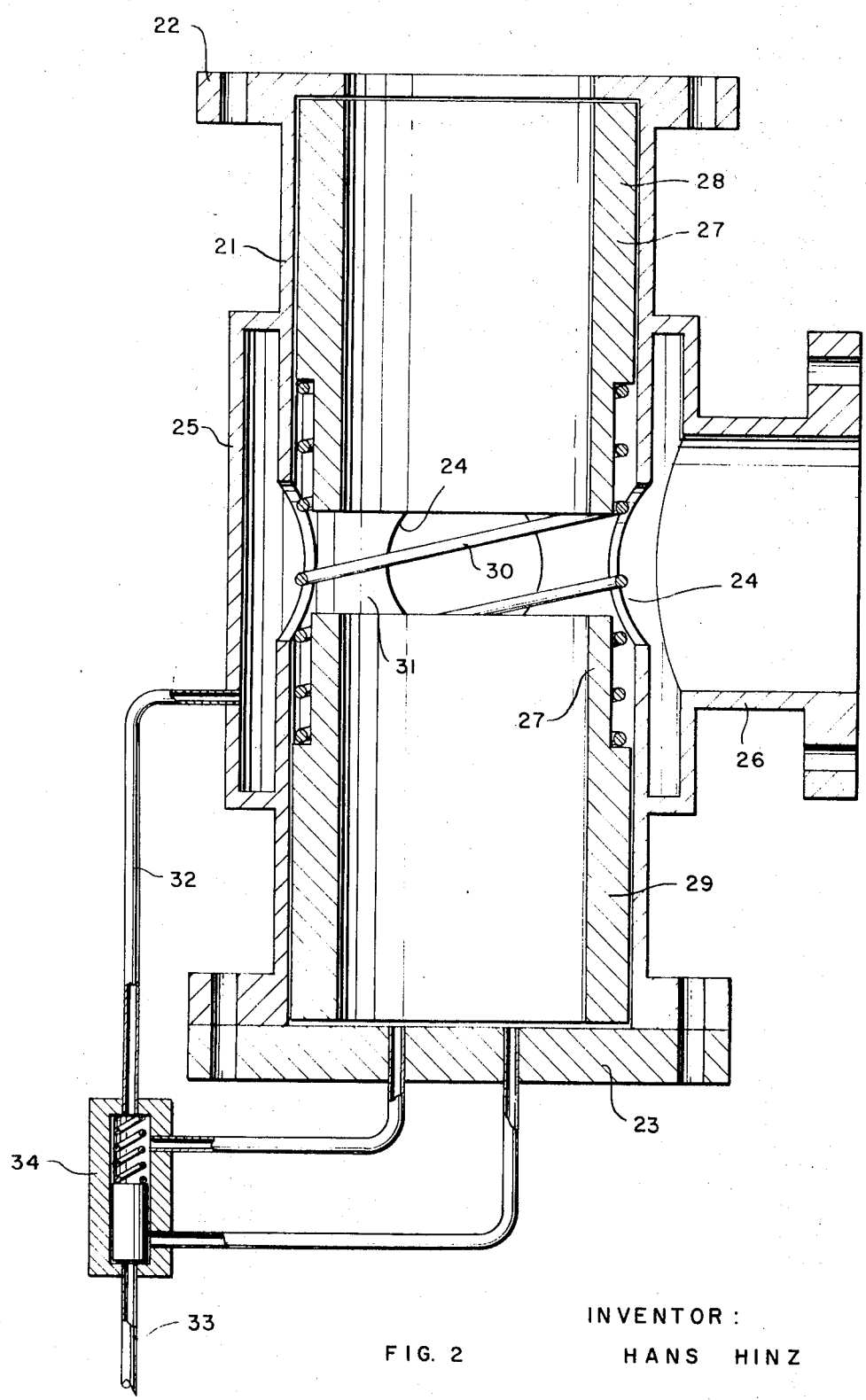
FIG. 2 is a view similar to that of FIG. 1 but illustrating an alternative form of pig trap according to the present invention.

FIG. 2 shows another embodiment of the invention. A housing 21 with a flange 22 and a cover 23, openings 24, an outer jacket 25 and a branch 26 has the same form as in the previous embodiment. Sleeve 27, however, is divided in the drawing into an upper half 28 and a lower half 29 which, in the position of rest, are kept in abutment above and below by a spring 30, leaving between them a gap 31 which, together with the openings 24, forms the connection between the pipeline and the storage tank. The rims of the sleeve section 28 and 29 are each provided with sealing rings and are suitably so designed that they engage by means of grooves (not shown in drawing).

This device operates as follows:

An arriving pig entering the sleeve section 28 forces the latter downward against the spring 30 owing to wall friction, until the lower rim of 28 rests on the upper of 29. As a result, the pipeline is shut off from the storage tank. The pig moves on into the sleeve 29 down to the bottom 23 of the device, the remaining liquid escaping through a by-pass 32. Meanwhile, the upper sleeve section 28 is retained in its lower position by the pressure of the compressed air on its now free upper face. After the compressed air supply has been turned off and the pressure in the pipeline has been released, the spring 30 returns the sleeve section 28 to its starting position, thereby freeing the connection between the pipeline and the storage tank.

To dispatch the pig, compressed air is fed into the device through a line 33 in this case as well. A valve 34 operates as in the previous embodiment. As a result of the pressure building up under (in the drawing) the pig, this is moved upward, taking with it the sleeve section 29 owing to wall friction, so that as a result of the gap 31 between 28 and 29 being closed, the connection between the storage tank and the pipeline is shut off again. After the pig has passed through the upper sleeve section 28 and entered the pipeline, the lower sleeve section 29 is retained in its upper position by the air pressure on its lower face, until the spring 30 returns it to its position of rest, after the operation has been completed, the compressed air supply has been turned off and the pressure in the pipeline has been released.

A possible drawback of this embodiment is that the pigging operation cannot be directly resumed after an interruption. If, for example, the propellant air pressure drops after a pig has been dispatched but has not yet arrived at the other end of the pipeline, the sleeve section 29 returns to its position of rest, freeing the openings 24. The propellant air then escapes into the storage tank through the branch 26, after the air pressure has been restored.

Figure 3:
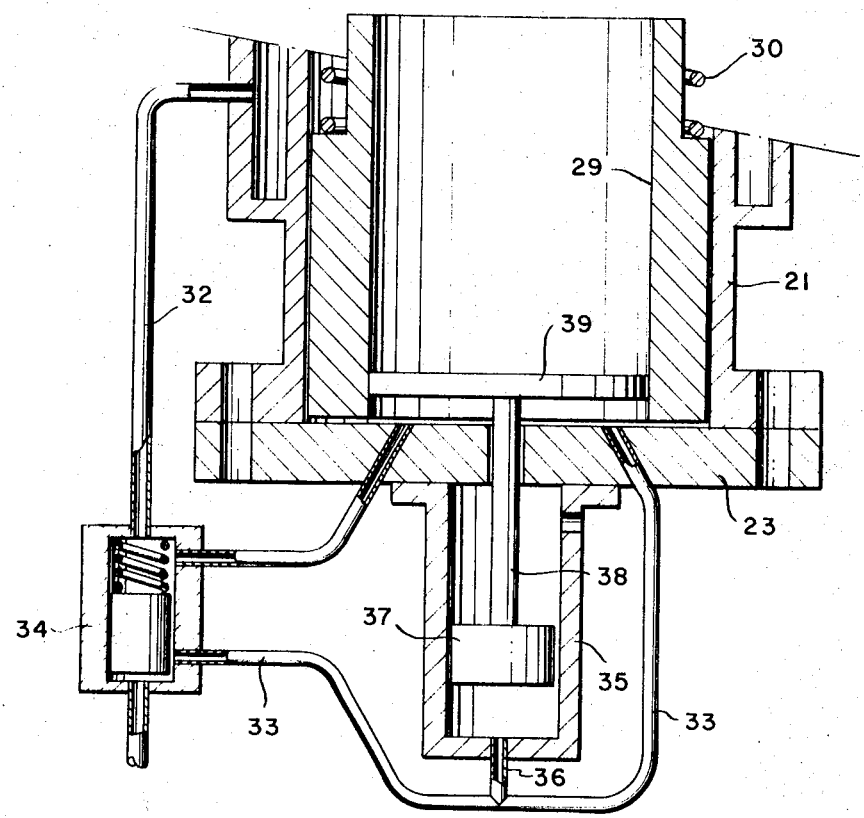
FIGS 3 and 4 are diagrammatic views illustrating selected portions of still other alternative embodiments of the pig trap according to the present invention.

If it is essential to allow for interruptions of this type, the embodiment shown diagrammatically in FIG. 3 is suitable. A cylinder 35 is arranged on the bottom or cover 23 in the axis of the pig trap, to which cylinder compressed air is supplied through a branch 36 of the line 33. A piston 37 acts on the sleeve section 29 by means of its rod 38 and a crosspiece 39. The pressure gradient along the line 33 and/or the back pressure which the escaping propellant air meets in the storage tank are generally sufficient to effect the required closing movement of the sleeve 29, when the air pressure rises again after an interruption. If necessary, a low-effect throttle element is installed in the line 33 between the branch 36 to the cylinder 35 and the point of entry into the pig trap.

Figure 4:
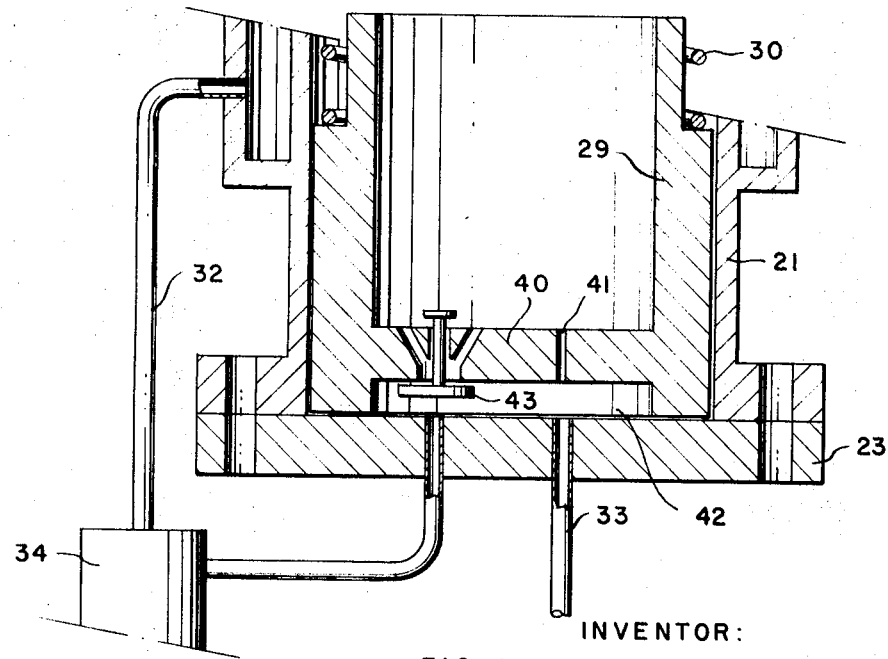

Another embodiment shown diagrammatically in FIG. 4 serves the same purpose as the embodiment described below. The sleeve section 29 has a bottom 40 which is slightly recessed with respect to the lower end of the sleeve section 29. The bottom 40 is provided with a passageway 41 through which the propellant air flows into the interior of the pig trap and consequently into the pipeline. The dimensions of the air passageway 41 are such that there is built up between the antechamber 42, formed by the bottom 23 and the sleeve bottom 40, and the interior of the pig trap, a pressure gradient sufficient to cause the sleeve section 29 to perform its closing movement against the pressure of the spring 30.

A check valve 43 is suitably arranged in the bottom 40 in order to facilitate the escape of the liquid through the by-pass 32 when a pig arrives.

The course of the operations described can be easily monitored on the basis of the pressure of the propellant air. After a pig has been dispatched, the pressure reaches the level required to overcome the wall friction and the flow resistance of the liquid displaced by the pig. This pressure remains more or less constant until the pig has reached the trap at the other end of the pipeline, then the pressure rises fairly suddenly to the full compressor pressure. This pressure rise is suitably utilized to actuate an optical or acoustic signal indicating that the operation has been completed. Automatic shutting-off of the compressed air and release of the pressure in the pipeline can also be brought about in the known manner when the compressor pressure is reached.

I claim as my invention:

1. Apparatus for manipulating scraper means conveyed through a pipeline comprising:
   a housing connected at an open end to said pipeline and closed at an opposite end to form a bottom;
   a passageway through said housing connecting said pipeline with a T branch at a side of said housing and shaped to contain sleeve means;
   sleeve means axially movable in said passageway in said housing from a first position to a second position, said sleeve means when in said first position permitting material flow through said passageway and T branch between said pipeline and material receiving means and when in said second position cutting off material flow between said pipeline and said material receiving means; and
   by-pass means extending from said bottom of said housing to said T branch to permit material flow therethrough with said sleeve means in said second position.

2. The apparatus of claim 1 further comprising a piston connected to said sleeve means, and operatively associated with a compressed air cylinder to axially move said sleeve means into either said first position or said second position.

3. The apparatus of claim 1 wherein said sleeve means comprises a plurality of aligned sleeve sections adapted to move axially with respect to one another to regulate material flow between said pipeline and said material receiving means.

4. The apparatus of claim 3 wherein said sleeve means includes a bottom having a restricted air passage therethrough which is in communication with an antechamber between said bottom and said housing and check valve means in said bottom adapted to maintain a pressure gradient between the interior of said sleeve means and said antechamber.

5. The apparatus of claim 3 wherein a piston activated by compressed air is connected with a crosspiece within said sleeve means via a rod which extends through said housing and is adapted to maintain pressure within said sleeve means by axial movement of said crosspiece.

References Cited

UNITED STATES PATENTS 3,265,083  8/1966  Sachnik _____ 137—268
3,512,554  5/1970  Childers _____ 15—104.06 A X EDWARD L. ROBERTS, Primary Examiner U.S. Cl. X.R.

137—268